(12) United States Patent
Chen et al.

(10) Patent No.: US 7,268,848 B2
(45) Date of Patent: Sep. 11, 2007

(54) CONTINUOUS DOMAIN IN-PLANE SWITCHING LIQUID CRYSTAL DISPLAY

(75) Inventors: Chueh-Ju Chen, Miao-Li (TW); Jia-Pang Pang, Miao-Li (TW); Chiu-Lien Yang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 334 days.

(21) Appl. No.: 10/966,213

(22) Filed: Oct. 15, 2004

(65) Prior Publication Data
US 2005/0083468 A1 Apr. 21, 2005

(30) Foreign Application Priority Data
Oct. 15, 2003 (TW) .............................. 92128502 A

(51) Int. Cl.
*G02F 1/1343* (2006.01)
(52) U.S. Cl. ...................................... 349/141
(58) Field of Classification Search ............... 349/141
See application file for complete search history.

(56) References Cited

U.S. PATENT DOCUMENTS

| | | |
|---|---|---|
| 5,946,066 A | 8/1999 | Lee et al. |
| 5,986,735 A | 11/1999 | Komatsu |
| 6,618,109 B2 * | 9/2003 | Hidehira et al. ............ 349/141 |

\* cited by examiner

*Primary Examiner*—James A. Dudek
(74) *Attorney, Agent, or Firm*—Wei Te Chung

(57) ABSTRACT

A multi-domain IPS (in-plane switching) liquid crystal display (20) includes a first substrate (201), a second substrate (202), liquid crystal molecules (203) filled between the first and second substrates, and gate lines (211) and data lines (212) formed on the first substrate. The gate lines and data lines define pixel regions arranged in a matrix. Each pixel region includes pixel electrodes (233), common electrodes (243), and a TFT (thin film transistor) (220). The pixel electrodes and the common electrodes have a same curved shape, and are uniformly spaced apart from each other. Therefore the electric field generated by them is a smooth continuum of multiple domains, and the visual performance at various different viewing angles is equally good. Because the pixel and common electrodes do not have sharp bends, disclination is avoided. Therefore the IPS liquid crystal display has a high contrast ratio.

9 Claims, 4 Drawing Sheets

CONTINUOUS DOMAIN IN-PLANE SWITCHING LIQUID CRYSTAL DISPLAY

BACKGROUND OF THE INVENTION

1. Field of the Invention

The present invention relates to an IPS (in-plane switching) mode LCD (liquid crystal display), and the control of liquid crystal molecules therein.

2. Description of Prior Art

A liquid crystal display utilizes the optical and electrical anisotropy of liquid crystal molecules to produce an image. The liquid crystal molecules have a particular passive orientation when no voltage is applied thereto. However, in a driven state, the liquid crystal molecules change their orientation according to the strength and direction of the driving electric field. A polarization state of incident light changes when the light transmits through the liquid crystal molecules, due to the optical anisotropy of the liquid crystal molecules. The extent of the change depends on the orientation of the liquid crystal molecules. Thus, by properly controlling the driving electric field, an orientation of the liquid crystal molecules is changed and a desired image can be produced.

The first type of LCD developed was the TN (twisted nematic) mode LCD. Even though TN mode LCDs have been put into use in many applications, they have an inherent drawback that cannot be eliminated; namely, a very narrow viewing angle. By adding compensation films on TN mode LCDs, this problem can be ameliorated to some extent. However, the cost of the TN mode LCD is increased. Therefore, a totally different driving means called IPS (in-plane switching) was proposed as early as in 1974. Then in 1993, Hitachi Corporation filed its first US patent application concerning IPS, in which an IPS mode LCD was disclosed.

A conventional IPS mode LCD has an upper substrate, a lower substrate, and a liquid crystal layer interposed therebetween. The liquid crystal layer has a plurality of liquid crystal molecules which have a same orientation when not driven, this orientation being parallel to the substrates. Pixel electrodes and common electrodes are disposed on the lower substrate. When a voltage is applied to the electrodes, an electric field is generated between the electrodes. The electric field drives the liquid crystal molecules to rotate, so that they have a new orientation that is still parallel to the substrates. The change in orientation results in a change in light transmission. In other words, the operation of the IPS mode LCD is such that the liquid crystal molecules rotate in a plane parallel with the substrates in order to fulfill optical switching. The displayed image has the important advantage of a wide viewing angle. In basic IPS mode LCDs, the pixel electrodes and common electrodes are each comb-shaped. The electric field of these LCDs in a driven state is along a certain direction. When the displayed image is viewed at different oblique angles, an observer notices a quite large color shift.

Referring to FIG. 5, this is a schematic plan representation of a pixel area P of an IPS liquid crystal display as disclosed by U.S. Pat. No. 6,459,465 issued on Oct. 1, 2002. The pixel area P comprises a gate line 113 arranged in a first direction, a data line 115 and a common line 135 both arranged in a second direction orthogonal to the first direction, a TFT (thin film transistor) 120 positioned at an intersection of the data line 115 and the gate line 113, a pixel electrode 131, and a common electrode 133. The TFT 120 has a gate electrode 121, a source electrode 123 and a drain electrode 125, which are connected with the gate line 113, the data line 115 and the pixel electrode 131 respectively. The pixel electrode 131 and the common electrode 133 are spaced apart from each other. The pixel and common electrodes 131, 133 are each comb-shaped, with the teeth thereof being zigzagged. Portions of the teeth of the pixel and common electrodes 131, 133 that are parallel to each other in a first direction form a first sub-electrode group. Portions of the teeth of the pixel and common electrodes 131, 133 that are parallel to each other in a second direction form a second sub-electrode group.

When a voltage is applied, because the pixel and common electrodes 131, 133 have zigzagged structures, the electric field (not shown) generated is mainly along two directions. Turning to FIG. 6, the upper portion thereof shows part of the first sub-electrode group, and the lower portion thereof shows part of the second sub-electrode group. The liquid crystal molecules 130 in the upper and lower portions have different orientations, and the LCD exhibits a two-domain display effect. When viewing the LCD display from any oblique angle, the color shifts generated by the two domains counteract, and thus the overall color shift of the display is small.

However, at junctions of the first and second sub-electrode groups, the electric field is abnormal, and the liquid crystal molecules thereat cannot be driven properly. In other words, a disclination of the liquid crystal molecules is generated at the bends of the teeth of the pixel and common electrodes 131, 133. Light thereat cannot transmit properly, and the contrast ratio of the pixel area is lowered. Furthermore, the two-domain electrode configuration of the LCD inherently limits the display thereof. Equally good visual performance at various different viewing angles cannot be attained.

It is desired to provide a multi-domain IPS liquid crystal display which overcomes the above-described deficiencies.

SUMMARY OF THE INVENTION

An object of the present invention is to provide a multi-domain IPS liquid crystal display which has a high contrast ratio and improved wide viewing angle characteristics.

A preferred kind of IPS liquid crystal display of the present invention comprises a first substrate and a second substrate, and liquid crystal molecules interposed between the substrates. A plurality of gate lines and a plurality of data lines are formed on the first substrate, thereby defining a plurality of pixel regions arranged in a matrix. Each pixel region comprises a plurality of pixel electrodes, a plurality of common electrode, and a TFT. The TFT has a gate electrode connected to the gate line, a source electrode connected to a data line, and a drain electrode connected to the pixel electrodes. The pixel electrodes and the common electrodes have a same curved shape, and are uniformly spaced apart from each other.

Because the pixel and common electrodes have the curved shape, the electric field generated by them is a smooth continuum of multiple domains. Therefore the visual performance at various different viewing angles is equally good. Further, because the pixel and common electrodes do not have sharp bends, disclination manifest in the prior art is avoided. Therefore the IPS liquid crystal display has a high contrast ratio.

Other objects, advantages, and novel features of the present invention will become more apparent from the following detailed description when taken in conjunction with the accompanying drawings, in which:

DETAILED DESCRIPTION OF THE INVENTION

Figure 1:
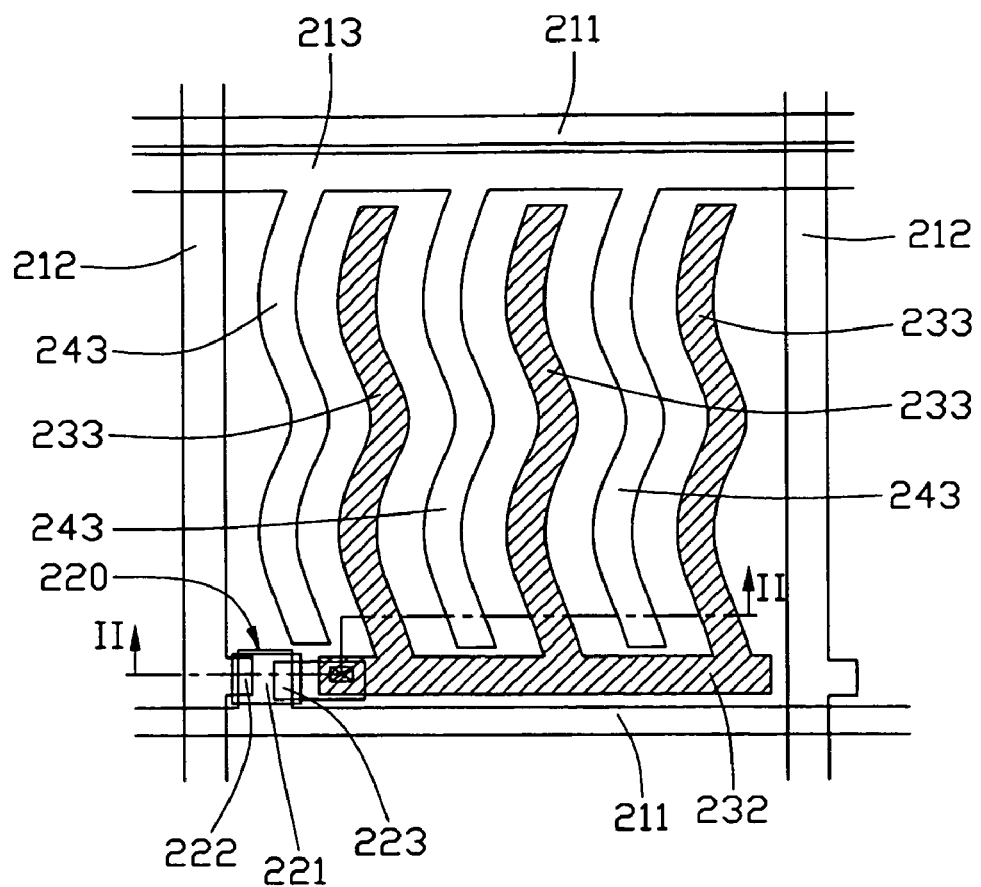
FIG. 1 is a schematic, top elevation of a pixel region of an IPS LCD according to a first embodiment of the present invention.
Figure 2:
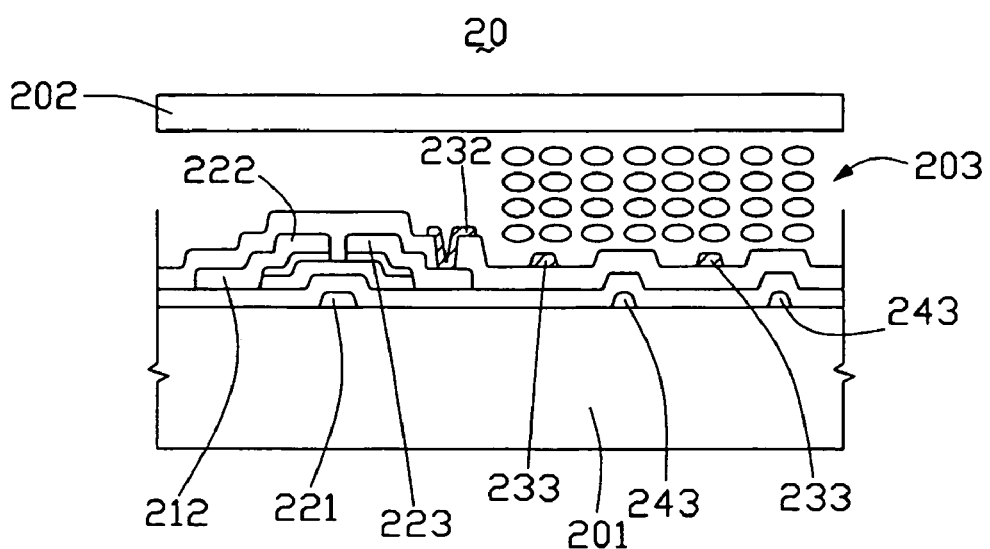
FIG. 2 is a schematic, side cross-sectional view taken along line II-II of FIG. 1.

Referring to FIG. 1 and FIG. 2, an in-plane switching liquid crystal display (IPS LCD) 20 according to the first embodiment of the present invention comprises a first substrate 201, a second substrate 202, positive liquid crystal molecules 203 interposed between the first and second substrates 201, 202, and a plurality of gate lines 211 and data lines 212 formed on the first substrate 201. The gate lines 211 and data lines 212 define a plurality of pixel regions arranged in a matrix.

Each pixel region comprises several common electrodes 243 and several pixel electrodes 233 that are disposed on different layers, a common line 213, and a TFT (thin film transistor) 220. The TFT 220 has a gate electrode 221 connected to a gate line 211, a source electrode 222 connected to a data line 212, and a drain electrode 223 connected to the pixel electrodes 233 through a pixel line 232. The common line 213 is connected to the common electrodes 243. The pixel electrodes 233 and the common electrodes 243 have a same wavy shape, and are spaced a uniform distance apart from each other. The pixel electrodes 233 and common electrodes 243 can be made of a metallic material or a transparent conductive material such as ITO (indium tin oxide). The IPS LCD 20 has a higher aperture ratio if the electrodes 233, 243 are transparent.

Figure 3:
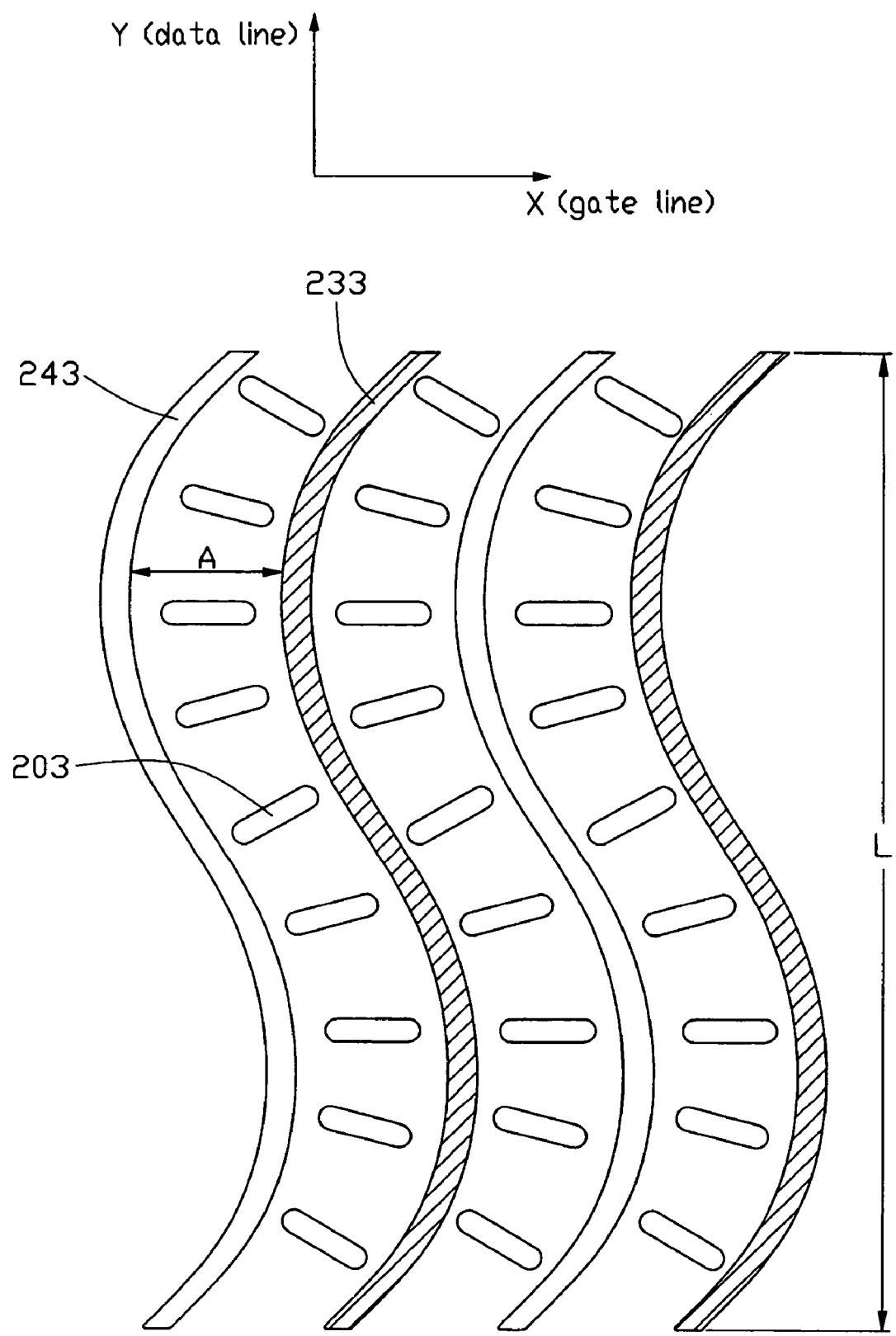
FIG. 3 is a schematic, enlarged view of part of pixel and common electrodes of the pixel region of FIG. 1, showing approximate orientations of liquid crystal molecules therebetween when the IPS LCD is in a driven state.

FIG. 3 shows the structure of the pixel electrodes 233 and the common electrodes 243 and the approximate orientation of liquid crystal molecules 203 in a driven state. A Cartesian coordinate system is defined, with the X axis being parallel to the gate line 211 and the Y axis being parallel to data line 212. A path defining the shape of each pixel electrode 233 and each common electrode 243 satisfies the following equation:

$$x = A\sin(\pi * y/2L), (0 \leq y \leq L) \quad (1)$$

where x and y are Cartesian coordinates of any point along the path, A is the interval between each adjacent pixel electrode 233 and common electrode 243, and L is a length of the electrode 233, 243 along the y axis.

In the driven state, even though the pixel electrodes 233 and the common electrodes 243 are not on the same layer, a driving electric field is generated that is substantially parallel to the first and second substrates 201, 202. As the Y axis position increases, the electric field changes from the 4 o'clock direction to the 3 o'clock direction and then the 2 o'clock direction, and further to the 3 o'clock direction and then the 4 o'clock direction. The positive liquid crystal molecules 203 align parallel with the electric field. Therefore the orientation of the liquid crystal molecules 203 also changes between the 4 o'clock and 2 o'clock positions in the same manner as described above.

The pixel and common electrodes 233, 243 have bends, but their bends are smooth. Therefore disclination of the liquid crystal molecules 203 does not occur, and the contrast ratio of the IPS LCD 20 is unimpaired. Furthermore, because the pixel and common electrodes 233, 243 have the wavy shape, the electric field generated by them is a smooth continuum of multiple domains, and the IPS LCD 20 provides equally fine visual performance at various different viewing angles.

In an alternative embodiment, a path defining the shape of each pixel electrode 233 and each common electrode 244 satisfies the following equation:

$$x = A\sin(\pi * y/NL), (0 \leq y \leq L, N > 2) \quad (2)$$

where x and y are Cartesian coordinates of any point along the path, A is the interval between each adjacent pixel electrode 233 and common electrode 243, and L is a length of the electrode 233, 243 along the y axis.

Figure 4:
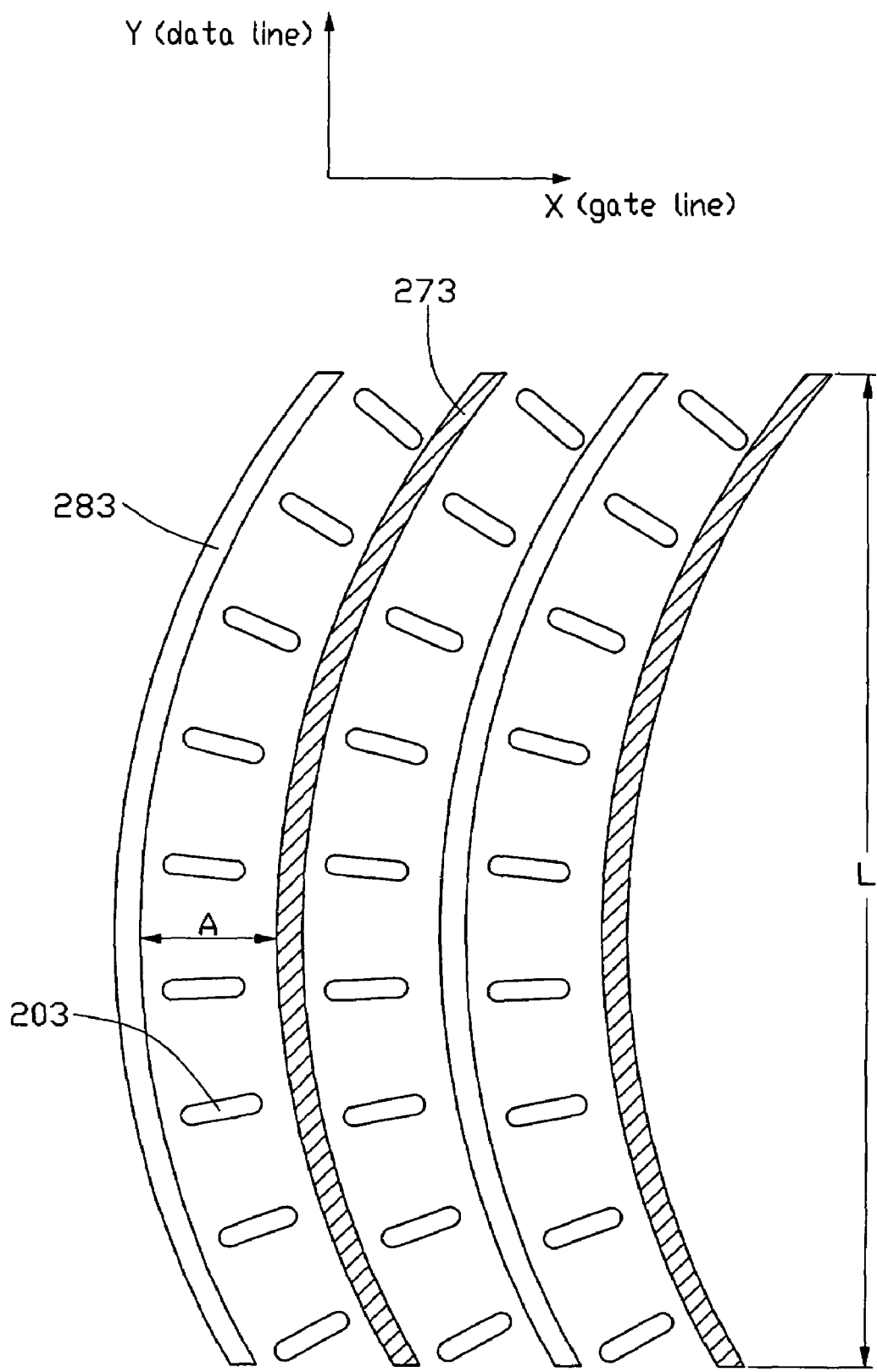
FIG. 4 is similar to FIG. 3, but showing the situation in respect of an IPS LCD according to a second embodiment of the present invention.
Figure 5:
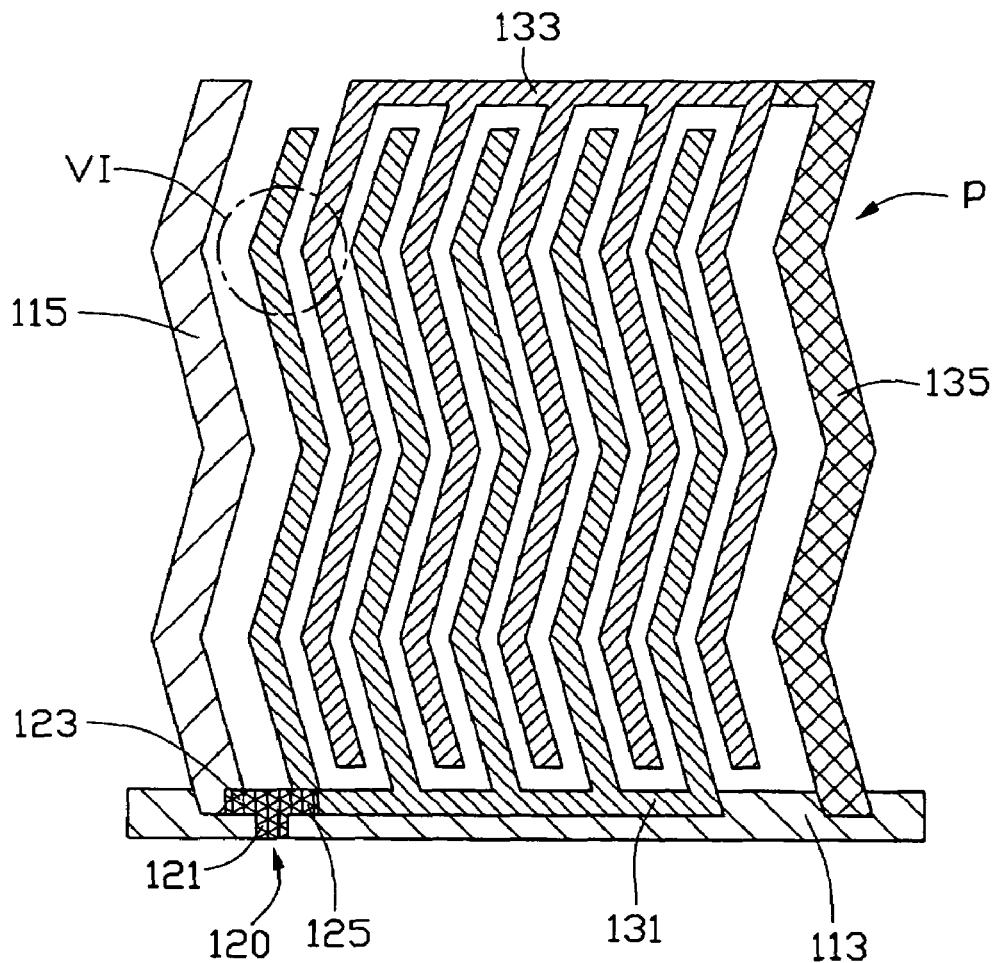
FIG. 5 is a top cross-sectional view of a pixel region of a conventional IPS LCD.
Figure 6:
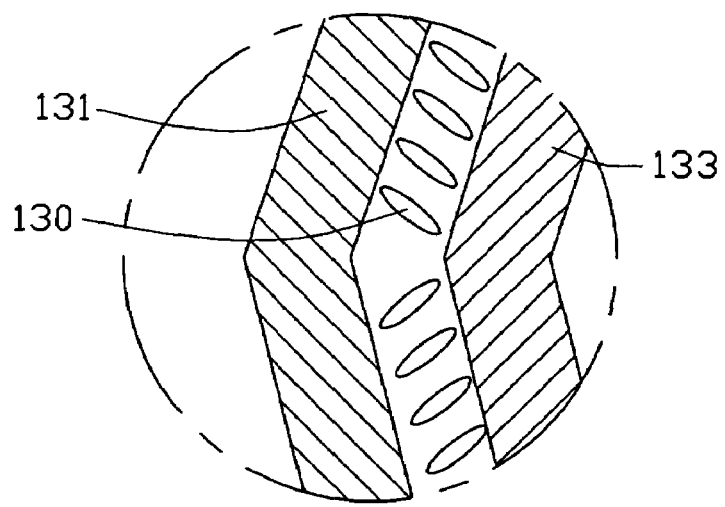
FIG. 6 is essentially an enlarged view of a circled portion VI of FIG. 5.

Referring to FIG. 4, arcuate pixel electrodes 273 and arcuate common electrodes 283 are employed for an IPS LCD according to the second embodiment of the present invention. Using the same Cartesian coordinate system as that of FIG. 3, a path defining the shape of each pixel electrode 273 and each common electrode 283 satisfies the following equation:

$$x = A\sin(\pi * y/L), (0 \leq y \leq L) \quad (3)$$

wherein x and y are Cartesian coordinates of any point along the path, A is the interval between each adjacent pixel electrode 273 and common electrode 283, and L is a length of the electrode 273, 283 along the y axis.

In alternative embodiments, the pixel electrodes 233, 273 and common electrodes 243, 283 may be formed on a same layer by utilizing contact holes or other suitable means. This enables a true in-plane electric field to be generated, with the efficiency of utilization of the electric field being higher.

It is also to be generally understood that even though numerous characteristics and advantages of the present invention have been set out in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. An IPS (in-plane switching) liquid crystal display, comprising:
   a first substrate;
   a second substrate;
   liquid crystal molecules interposed between the substrates;
   a plurality of gate lines and a plurality of data lines formed on the first substrate, thereby defining a plurality of pixel regions; and
   at least one pixel electrode, at least one common electrode, and a TFT (thin film transistor) provided in each pixel region;
   wherein said at least one pixel electrode and said at least one common electrode have a same curved shape, and are uniformly spaced apart from each other; and a path defining the curved shape of said at least one pixel electrode and said at least one common electrode satisfies the following equation:

$$x = A \sin(\pi * y/L), (0 \leq y \leq L)$$

where x and y are Cartesian coordinates of any point along the path, A is the interval between adjacent said at least one pixel and common electrodes, and L is the length of said at least one pixel electrode or said at least one common electrode along the y axis.

2. The IPS liquid crystal display as claimed in claim 1, further comprising a common line on the first substrate.

3. The IPS liquid crystal display as claimed in claim 2, wherein the common line is parallel with the gate line and connected with said at least one common electrode.

4. The IPS liquid crystal display as claimed in claim 1, further comprising a pixel line on the first substrate to connect said at least one common electrode with a drain electrode.

5. The IPS liquid crystal display as claimed in claim 1, wherein said at least one pixel electrode and said at least one common electrode comprise indium-tin oxide.

6. The IPS liquid crystal display as claimed in claim 1, wherein said at least one pixel electrode and said at least one common electrode are made of metal.

7. An IPS (in-plane switching) liquid crystal display, comprising:

a pixel matrix substrate comprising a plurality of pixel regions;

wherein each pixel region comprises one or more pixel electrodes and one or more common electrodes, and said one or more pixel electrodes and said one or more common electrodes have a similar curved shape and are uniformly spaced apart from each other; and a path defining the curved shape of each of said one or more pixel electrodes and each of said one or more common electrodes satisfies the following equation:

$$x = A \sin(\pi * y/L), (0 \leq y \leq L)$$

where x and y are Cartesian coordinates of any point along the path, A is the interval between each adjacent of said one or more pixel and common electrodes, and L is the length of each of said one or more pixel electrodes or each of said one or more common electrodes along the y axis.

8. An IPS (in-plane switching) liquid crystal display, comprising:

a pixel matrix substrate comprising a plurality of pixel regions;

wherein each pixel region comprises at least one pixel electrode and at least one common electrode, said at least one pixel electrode and said at least one common electrode have a similar curved shape and are uniformly spaced apart from each other, the electric field generated by adjacent said at least one pixel and common electrodes defines at least two directions, and a transition of said at least two directions of the electric field is smooth; and a path defining the curved shape of said at least one pixel electrode and said at least one common electrode satisfies the following equation:

$$x = A \sin(\pi * y/L), (0 \leq y \leq L)$$

where x and y are Cartesian coordinates of any point along the path, A is the interval between adjacent said at least one pixel and common electrodes, and L is the length of said at least one pixel electrode or said at least one common electrode along the y axis.

9. The IPS liquid crystal display as claimed in claim 8, wherein said at least two directions are a multiplicity of directions which vary gradually from one to the next along one of said adjacent said at least one pixel and common electrodes in a continuous smooth cyclical manner due to a serpentine configuration of said one of said adjacent said at least one pixel and common electrodes.

* * * * *